June 22, 1926.  1,589,467
R. H. HASSLER
VEHICLE SUSPENSION SYSTEM
Filed Nov. 17, 1919  4 Sheets-Sheet 1
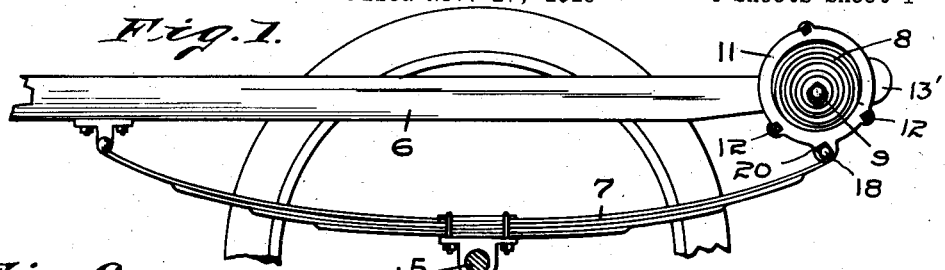
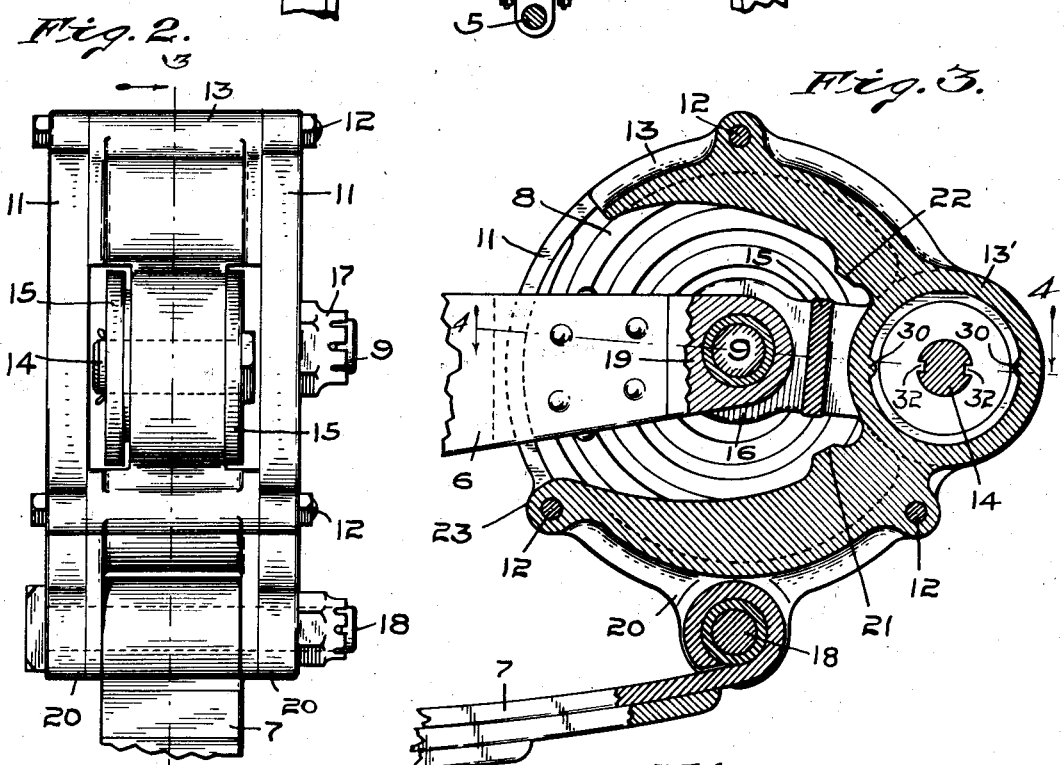
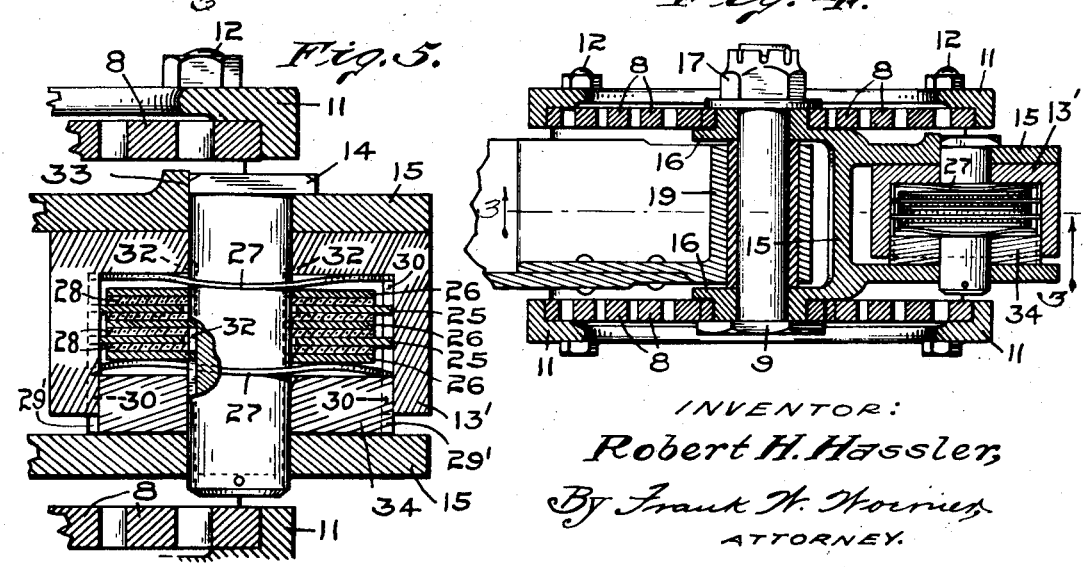
INVENTOR:
Robert H. Hassler,
By Frank H. Hoories
ATTORNEY.

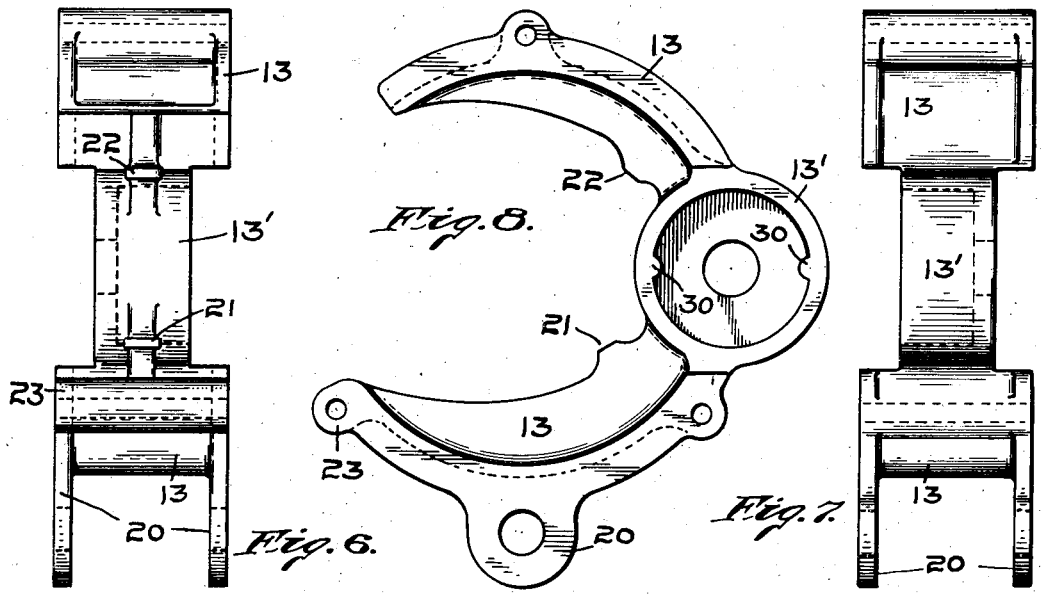
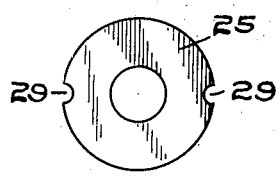 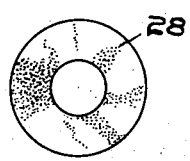 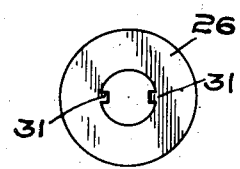 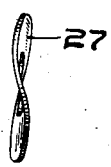
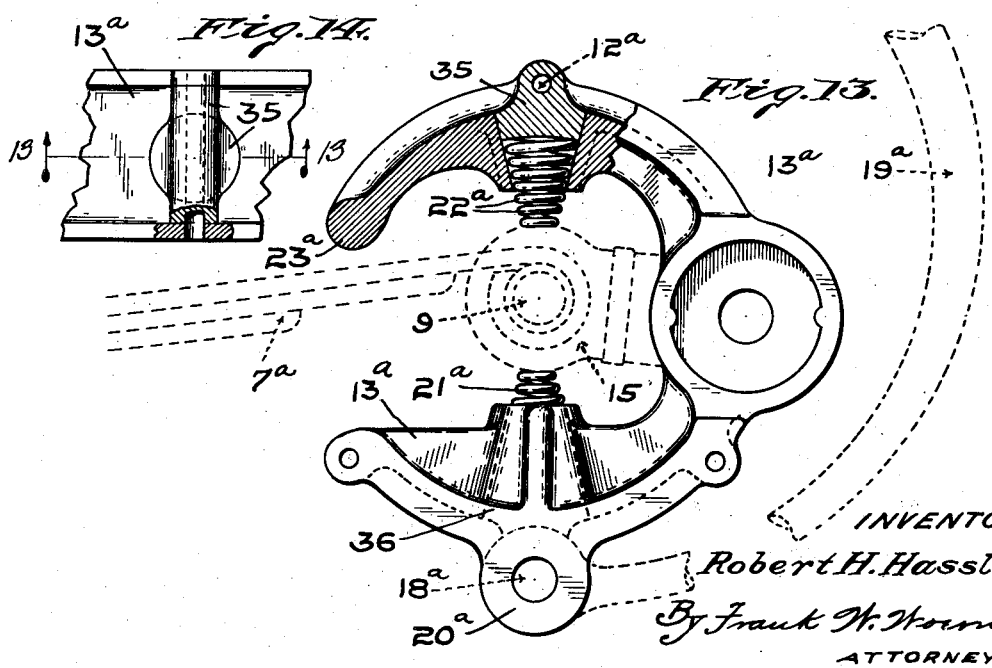

June 22, 1926.
R. H. HASSLER
VEHICLE SUSPENSION SYSTEM
Filed Nov. 17, 1919          4 Sheets-Sheet 3
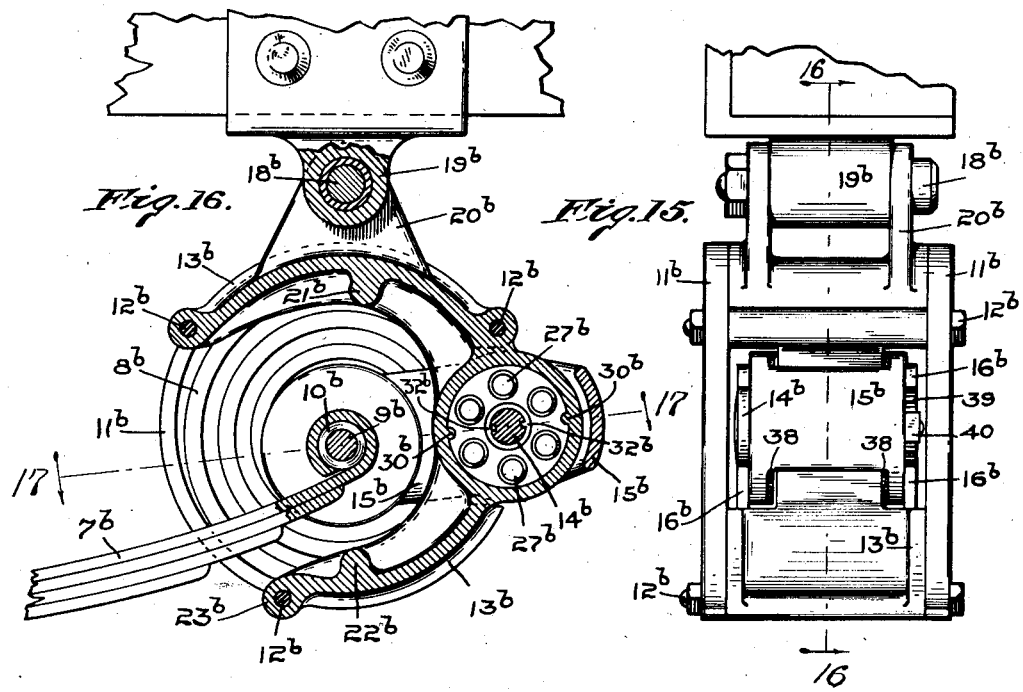
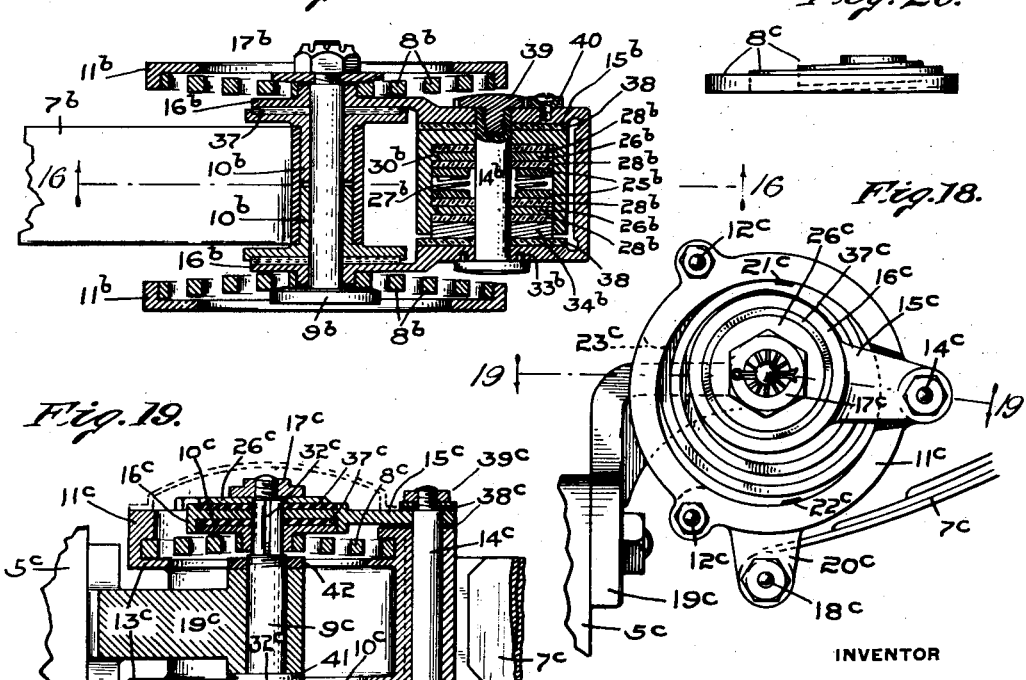
INVENTOR
Robert H. Hassler,
By Frank W. Woerner,
ATTORNEY.

June 22, 1926.
R. H. HASSLER
1,589,467
VEHICLE SUSPENSION SYSTEM
Filed Nov. 17, 1919   4 Sheets-Sheet 4
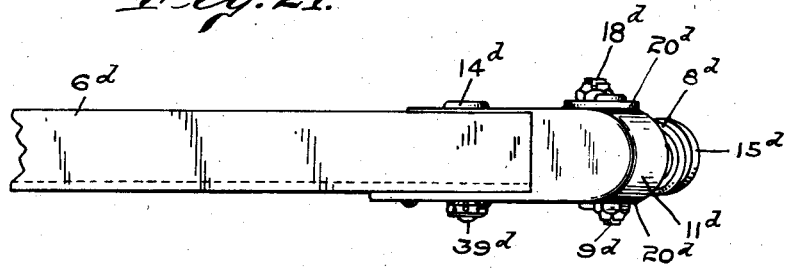
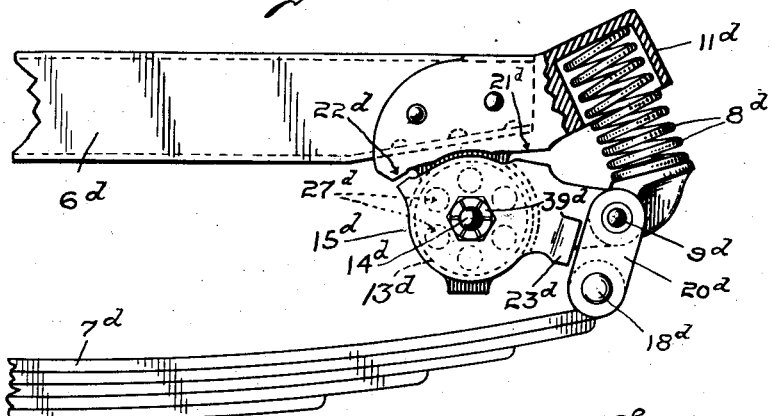
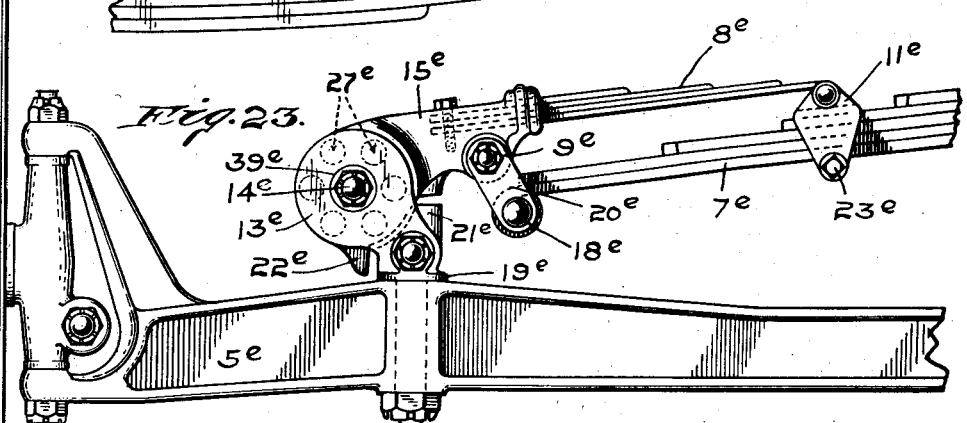
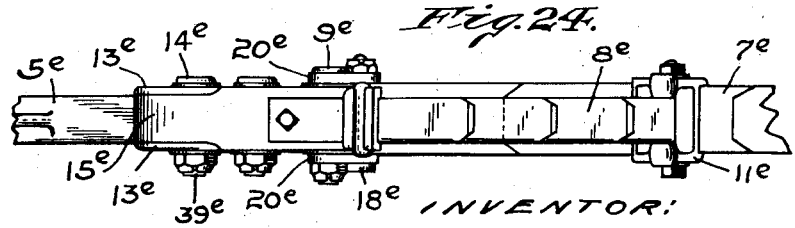
INVENTOR:
Robert H. Hassler,
By Frank H. Hoerner,
ATTORNEY.

Patented June 22, 1926.

1,589,467

UNITED STATES PATENT OFFICE.

ROBERT H. HASSLER, OF INDIANAPOLIS, INDIANA, ASSIGNOR TO ROBERT H. HASSLER, INC., OF INDIANAPOLIS, INDIANA, A CORPORATION.

VEHICLE SUSPENSION SYSTEM.

Application filed November 17, 1919. Serial No. 338,472.

My invention relates to vehicle suspension systems of the supplementary spring type in which the resilient and shock absorbing action of an ordinary main spring (of either the side leaf or the cross leaf form) is supplemented by an auxiliary elastic element interposed between the primary spring and one of the chassis members to which said spring is usually coupled. The principal purpose of this combination is to obtain a very sensitive and flexible suspension organization by which both light and heavy shocks, that are imparted to the running gear members in the passage of the wheels over the road, may be effectively taken up or "absorbed", by the cooperating spring elements, before they reach the body of the vehicle. In order to accomplish this object the supplemental or secondary resilient members have been usually made considerably more elastic than the main springs and so connected therewith that the auxiliary or supplemental action may take place either independent of, or concurrently with, the primary spring action; thereby permitting the lighter shocks and the relatively small oscillatory movements of the vehicle parts to be "absorbed" by the more elastic elements—without necessarily imposing any concurrent flexure on the main springs—while the heavier shocks and the larger movements of the spring connected members, will be resisted and "taken up" by both sets of elastic elements. This makes it possible to obtain a very effective "cushioning" action that will efficiently restrain and "damp" both the minor and the major vibrations of the vehicle parts and thus ensure "easy riding" on both smooth and rough road surfaces.

Because of these functional advantages the "supplemental spring suspension" type of shock absorber has, of late years, been extensively used, particularly on high speed motor driven vehicles. But the very features of construction which give to this system its peculiar and characteristic advantages introduce certain difficulties. The sensitiveness of the supplemental spring action—which is effective in securing the quick and efficient response of the system to light shocks—has a tendency to permit a correspondingly free "recoil" or "rebound" of the auxiliary resilient elements and thus set up, under some conditions, a periodic vibration or oscillation of the vehicle body, which is almost as unpleasant as the jolting and tossing which the system is designed to overcome. The flexibility of the secondary spring members also renders these elements of the system peculiarly subject to undue flexure and strain—when they are subjected to excessive load stresses or road shocks—with the consequent danger of permanent distortion or premature fracture. The introduction of the additional supplemental spring elements multiplies the number of flexible and articulated joint connections between the main elastic suspension members and the chassis parts, with a resultant increase in the possibilities of side sway or relative lateral movement between the said parts; and in some forms of supplemental spring construction this last mentioned difficulty is a very serious one. And still another defect of any multiple-jointed combination of main and auxiliary spring members is that the number of points at which wear can and does, occur is considerably increased; and the amount of such wear is further aggravated by the almost constant vibration and oscillation of the secondary elements with respect to main spring and chassis members. This wear in the connections—if not compensated, or "taken up" by continual readjustment—allows the parts to "rattle", and also introduces another cause of side sway or lateral swing that not only impairs the desired functioning of the spring elements in checking vertical oscillations, but also interferes with the proper and effective steering of the vehicle, particularly when making quick turns or when rounding corners at a high speed, and all of the last mentioned difficulties and defects— which introduce, or result in, an increased amount of either transverse rocking or "fore and aft" pitching of the body with respect to the running gear—not only decrease, the "easy riding" qualities of the vehicle, but also increase the element of danger to the occupants thereof.

The objects of my invention are, in general, to eliminate, or greatly reduce, the above enumerated disadvantages of the supplemental spring suspension type of shock absorber, without sacrificing any of the advantageous characteristics of that type of construction; and to thereby attain a greatly increased degree of efficiency and reliability in the continued operation of such devices under particularly severe conditions of use.

More specifically stated some of the more important aims of the various features of improvement hereinafter described and claimed are: First, the provision of certain forms of supplemental spring elements, and of mountings therefor, which will be less subject to lateral displacement, and to injury under excessive stress conditions, than the forms now in use. Second, the provision of "stop" devices which limit the flexual action of the auxiliary springs and thus prevent their undue distortion or breakage by abnormal oscillatory movements of the spring connected chassis members: Third, the provision of means for frictionally "damping" the normal period of vibrations of the supplemental spring elements of the suspension system; thereby increasing their resistance to compressive stresses and also decreasing their tendency to subsequent rebound or "tossing" action: Fourth, the utilization of the "friction check" mechanism for automatically taking up the wear and the resultant "lost motion" at the pivot or articulated joint couplings between the supplemental springs and the other members of the main suspension system—thereby preserving the initial alignment of the vertically oscillating parts and preventing "side sway" or relative lateral displacement of the spring connected body and running gear members of the vehicle: And fifth, the provision of suitable means for enclosing the supplemental-spring-friction check mechanism and protecting the operating parts thereof against the entry and the abrasive action of dust or other deleterious substances. Other accessory objects, and other inherent advantages, of my invention will be made apparent, to those skilled in the art, by the following description of several illustrative embodiments of my improvements as applied to various forms and species of shock absorber constructions.

In the drawings—which constitute an essential part of this disclosure—Fig. 1 is a general diagrammatic view of one form of my improved supplemental spring suspension construction, applied to a side leaf main spring of the usual form; Fig. 2 is an end view—on an enlarged scale—of the supplemental spring mounting shown at the right hand end of Fig. 1; Fig. 3 is a vertical sectional elevation, on the plane 3—3 of Figs. 2 and 4; Fig. 4 is a sectional plan view on the plane 4—4 of Fig. 3; Fig. 5 is an enlarged horizontal section—on the same plane—of a portion of the mechanism shown in the preceding figure; Figs. 6, 7 and 8 are, respectively, front and rear end views and a side view of one of the structural elements of the combination shown in Figs. 1 to 4; and Figs. 9, 10, 11 and 12 are detail views of certain other structural elements of the said combination.

Fig. 13 is a side elevation—and a partial vertical section on a plane 2ª—2ª corresponding to the plane 2—2 of Figs. 2 and 4—of a modification of the construction illustrated in Figs. 1 to 12; and Fig. 14 is a partial plan view of a part of the structure shown in Fig. 13.

Fig. 15 is an end view (corresponding to that shown in Fig. 2) of a further modification of the construction illustrated in the first twelve figures of the drawings; Fig. 16 is a side sectional elevation, on the plane 16—16 of Figs. 15 and 17; and Fig. 17 is a sectional plan view on the plane 17—17 of Fig. 16.

Fig. 18 is a side elevation of another embodiment of my invention, applied to a cross leaf main spring suspension; Fig. 19 is a sectional plan view on the plane 19—19 of Fig. 18; and Fig. 20 is a detail edge elevation of the supplemental spiral spring element used in this construction.

Fig. 21 is a plan view of a somewhat different embodiment of my invention, which is similar in many respects to the construction more fully illustrated and described in my copending application Ser. 303,314; and Fig. 22 is a side elevation of the structure shown in Fig. 21.

Fig. 23 is a side view of still another embodiment of my present invention as applied to a combination of a cross leaf main spring and a supplemental leaf spring lever suspension that is similar, in general structural form, to the organization described in my issued Patent No. 1,293,425; and Fig. 24 is a partial plan view of the construction shown in Fig. 23.

The various exemplifications of my improved suspension system which are illustrated in the first fourteen figures of the drawings, resemble in many respects the general organization that is disclosed and claimed in my prior Patent No. 1,286,614, issued Dec. 3, 1918; and in the following description the same reference numerals will be used, as far as possible, to designate the parts that correspond to those shown in this earlier publication. Corresponding reference characters will also be employed throughout the description—of all of the hereinbefore enumerated embodiments of my invention—to indicate analogous or equivalent elements of the new features of organization hereinafter described and claimed.

In the construction specifically illustrated in Figs. 1 to 12, 5 is the axle member, and 6 is one of the body members of a vehicle; and 7 is a side leaf main spring, that is clipped to the axle, near its center, and is pivotally coupled to the body frame, at one end, in the usual manner. The other end of the main spring is elastically connected to the body member 6 through the instrumentality of my improved supplemental spring organization. In the particular embodiment of my invention that is now being considered this comprises a pair of flat spiral springs 8, 8—(arranged one on each side of the end of the main spring 7)—which are supported at their centers on the ends of a pivot bolt 9, and are enclosed and supported at their outer peripheries by the housing rings 11, 11, that are clamped against the sides of the spacer cage 13, (shown separately in Figs. 6, 7 and 8) by means of bolts 12. The outer periphery of this spacer cage is provided with a boss 13', which is of less length, or width, than the main body of the spacer (as shown best in Figs. 2, 6 and 7), and which is centrally perforated to receive a pivot bolt 14. The central pivot bolt support 9 (for the inner coils of the spiral spring elements 8, 8) is coupled to the pivot bolt 14 in the housing cage (which supports the outer coils of the auxiliary springs) by means of an H shaped "radius" link 15 that is engaged at the extremities of its side arms by the two bolts. The inner convolutions of the spiral springs 8, 8 are clamped against the flanged ends 16, 16, of this radius link by the head and nut (17) of the pivot bolt 9, and are thus constrained to move in a predetermined vertical arc of travel with respect to the housing members 11—13 to which the other end of the link is pivoted (on the bolt 14), and in which the outer convolutions of the coils are supported.

The peripheral portions of the ring and spacer members (11 and 13) of the housing are also provided with projecting lugs, 20, 20, that are perforated to receive a third pivot bolt 18 which serves to couple the said housing to one of the relatively movable members of the vehicle.

As pointed out in my earlier Patent No. 1,286,614 the intercoupled parts of the above described combination are designed to take the place of the ordinary rigid shackle links that connect the end of the main spring to the chassis frame; and in the use of my improved supplemental spiral spring construction the two pivot bolts 9 and 18 serve to pivotally couple the device, either side up, to the same members that are ordinarily engaged by the shackle link bolts. In the particular arrangement of parts illustrated in Figs. 1 to 4, the pivot bolt 9 is passed through the hanger bracket, 19, that is attached to the body member 6, and the pivot bolt 18 is engaged with the eye at the end of the main spring 7. But the device may also be inverted—as shown in Figs. 1 and 3 of my former grant (loc. cit.) or in Figs. 13—15—16 of this application—in which case the pivot bolt 18$^b$ is engaged with the bracket 19$^b$, that is carried by the chassis member 6, and the pivot bolt 9$^b$ is passed through the eye of the main spring 7$^b$. In order to obtain the maximum range of action in the spiral spring elements, 8, 8, they are wound eccentrically—as shown in Fig. 4 of my prior patent of Dec. 3, 1918, No. 1,286,614—and are inserted in the housing support, 11—13, with the "open" portion of the convolutions turned toward the side on which the load or compressive stresses are applied. When the parts are coupled up in the manner shown in Fig. 3 the "open" part of the spiral coils is down, and in the unloaded, or lightly loaded condition, the interconnected elements assume the position shown in Fig. 3, and when heavily loaded, the position shown in Fig. 1. When the device is inverted, and connected to the main spring and body members in the manner shown in Fig. 3 of my former patent— or in Figs. 15 and 16 of this application— the "open" side of the eccentrically wound spiral is on top; and when lightly loaded the parts assume the position shown in Figs. 3 and 16 (ibid.), and when heavily loaded the position shown in Fig. 13. It will be noted that in all cases the eccentrically wound coils are positioned in the housing with the initially open portion of the convolutions above and adjacent to the eye of the main spring 7; and that no other change is necessary in order to use the device "either side up"; and that the functional action, and the result attaining characteristics of the organization are substantially the same in both positions of use.

The parts of my improved construction that have been thus far described differ in no essential respect from the correspondingly designated portions of the structure that is disclosed in my Patent No. 1,286,614; and no further explanation of the action of these parts under varying conditions of load and rebound stress is, therefore, necessary. I will now proceed to describe in greater detail the features of improvement which constitute the novel subject matter of my present application.

The first of these features is the provision of means for definitely and positively controlling and limiting the extent of flexural action of the supplemental or auxiliary spring elements of the combination; and thus relieving them of excessive strains when the parts are subjected to abnormal oscillatory movements in either direction. In the first illustrated embodiment of my present invention this control means consists of two rigid bosses or abutments 21, 22, which project inwardly from the spacer cage member 13, and are adapted to engage with the cross bar of the H shaped radius link, 15, when the latter has rocked or oscillated through a predetermined angle (about the pivot bolt 14); and a third end boss or abutment 23 on the same member (13), which is so positioned as to engage the body frame on rebound and thereby prevent an excessive recoil, and reverse flexure of the main spring 7. The successive action of these "stop" elements is as follows: An increased load stress on the pivot bolt 9—or a compressive shock that is transmitted through the main spring 7 to the pivot bolt 18—causes these shackle connections to move toward each other from the position shown in Fig. 3 to, or toward, that shown in Fig. 1. This movement may continue—either with or without a concurrent flexure or transverse bending of the main spring 7—until the lower edge of the radius link cross bar engages with the stop 21. When this engagement occurs the radius link 15 and the housing members 11—13, are locked against each other, and any further diametrical compression of the supplemental spring coils 8, 8, is rendered impossible. The interconnected and locked elements 11—13—15, now act as a rigid shackle to connect the end of the main spring to the vehicle body; and any further "closing" movement of these parts is resisted and controlled by the action of the main spring (7), supplemented by a slight torsional action of the spiral coils that is produced by the outward swing of the said shackle asemblage (11—13—15). as the main spring straightens out. When the parts rebound beyond the normal load position the pivot bolts, 9 and 18, separate until the cross bar of the link 15 comes in contact with the upper "stop" 22; and the parts are preferably so designed that this engagement takes place before the supplemental spring coils are reversely compressed beyond their initial eccentrically wound position (see Fig. 4 of Patent No. 1,286,614). After this engagement the link and housing memebers (11—13—15) are again locked together to act as a rigid shackle; and a continued rebound movement causes the main spring to "curl up" and swing the said shackle inwardly (or in a clockwise direction on the pivot bolt 9) until the boss 23 is brought against the frame member 6. When this third stop element is thus brought into action the shackle assemblage is locked, as a whole, against any further inward movement. This, in turn, prevents any further recoil and shortening of the main spring 7; and forces the latter to resist further rebound by a reverse straightening and transverse compression of its leaf elements. This dual stop control—on rebound movements—thus produces a double action of the main spring, 7, in resisting and restraining excessive oscillation of the vehicle parts in both directions from the normal load position of the suspension system; and it is particularly useful in checking the objectionable "tossing" of the vehicle body that results from the normally free and unchecked vibrations of an ordinary main spring support.

The second feature of my present invention is primarily directed to the checking and damping of the vibrations—due to successive compressions and expansions—of the coils of the supplemental spring elements; and the elimination, or minimization, of the rebound shocks that are caused thereby. I effect this result by providing means for frictionally retarding the relative movements of the parts that are connected with the extremities of the auxiliary springs. In the embodiment of my invention that is now being considered the friction check mechanism is associated with the bearing for the pivot bolt 14, and acts to resist the swinging movement of the radius link 15. This particular friction check device is best shown in the enlarged sectional plan view of Fig. 5. It comprises two sets of metal discs, 25, 25 and 26, 26, 26, which are coaxially mounted in alternating order on the pivot bolt 14, and are separated from each other by interposed washers 28, 28, 28, 28, of fibre or similar material. The discs, 25, are provided with peripheral notches, 29, that engage with ribs 30 on the inner surface of the hollow boss 13' in which the pivot bolt 14 is mounted; and the discs 26 have lugs 31 that fit into longitudinal grooves 32, 32, on the pivot bolt 14. This bolt is held against rotation in the ends of the link 15 in any suitable manner—as by the engagement of one side of its head against a projecting lug 33—and the discs 26 are thereby constrained to move with this oscillating radius connector or guide; while the discs 25 are circumferentially fixed with respect to the spacer member 13—13'. The open end of the cylindrical recess in the boss 13' is closed by a plate 34, which is also held in non-rotatable relation with the spacer member by peripheral notches 29' that engage with the ribs 30. The pile of friction discs are maintained in uniform pressure engagement with each other by spring members 27, 27 that are interposed between the ends of the pile and the adjacent faces of the recessed boss 13' and the plate 34.

The resistance to the relative rotary movements of the link connector 15, and the housing support 13—11—and the corresponding restraint and "damping" of the compression and expansion actions of the auxiliary springs—can be altered, as desired, either by changing the form and the temper of the spring elements 27, or by varying the number of the surface character of the disc elements 25, 26 and 28.

A third feature of my improvements is the utilization of the friction check mechanism to automatically take up any wear at the rocking joint between the radius link and the pivot bolt bearing therefor, and thus eliminate any rattle or side shake in this guide member for the vertically oscillating parts. In the construction shown in Figs. 1 to 5 this result is secured by the action of the springs 27, 27 which keep the outer faces of the boss 13' and its removable end plate 34 pressed tightly against the adjacent inner faces of the radius link 15.

The complete enclosure of the friction mechanism in the recessed boss 13' and the constant automatic maintenance of tight joints between the extended bearing surfaces on the members 13', 15 and 34 also serves to exclude dust and dirt from the working parts; and this further aids in preventing undue wear and irregular action of the cooperating elements of the combination. These last mentioned features of improvement are particularly important in the use of friction damped supplemental spring suspensions on motor vehicles which are employed in long runs on rough, sandy or dusty roads.

Figs. 13 and 14 illustrate a slightly modified form of spacer cage construction which can be substituted for the one shown in Figs. 6, 7 and 8. In this modification the rigid stops 21, 22 are replaced by spring stops $21^a$, $22^a$, which are arranged to engage with the end of the member in which the central pivot bolt 9 is supported. These resilient stops are stiff volute coil springs which are inserted in conical recesses in the spacer member $13^a$ and are held therein by blocks 35 and 36. The block 35 is clamped in place between the side flanges of the spacer by one of the cage bolts ($12^a$); and the opposite block is held in position in its coned recess by the engagement of its outer end with the member that engages the pivot bolt $18^a$.

The spacer construction last described—when used in combination with other elements of the organization shown in Figs. 1 to 5—may be connected to the relatively movable members of the vehicle in the manner illustrated in Figs. 1 and 3; or it may be coupled thereto in the manner indicated in dotted lines in Fig. 13. In the latter case the pivot bolt $9^a$ is engaged by the eye of the main spring $7^a$ and the pivot bolt $18^a$ is passed through the end of the scroll hanger $19^a$ that is secured to the body member of the vehicle. Under these conditions of attachment the upper portion of the segmental spacer member $13^a$ is extended downward to form a stop boss, $23^a$, which is adapted to engage with the upper leaf of the main spring $7^a$ when the parts are subjected to excessive rebound; and thus prevent further reverse flexure and "shortening" of the primary resilient element of the suspension in the manner previously explained.

In the embodiment of my invention that is shown in Figs. 15, 16 and 17, the general form and arrangement of the supplemental springs ($8^b$, $8^b$) the housing ring and spacer members $11^b$—$13^b$) and the radius link guide ($15^b$) are the same as in the first described organization; but the detail construction of these parts, and the specific form of the cooperating friction check and stop elements of the combination are modified as follows: The guide connector $15^b$ is U shaped (as best shown in the sectional view of Fig. 17) instead of H shaped; and is provided at its inner end with two enlarged heads, $16^b$, $16^b$, which serve not only to support the central convolutions of the auxiliary spiral springs, $8^b$, $8^b$, but also act as friction disc elements that engage with fibre or leather washers 37, 37, which are mounted in the recessed heads of the divided sleeve members $10^b$, $10^b$, that are nonrotatably secured in the eye of the main spring $7^b$. The supplemental spiral springs $8^b$, $8^b$ are wound in the form of an eccentric volute spring of small altitude, or of very slight axial pitch, (as shown in Fig. 20); and when these elements are clamped in position between the housing members $11^b$ and $13^b$ the central convolutions of the conically wound coils—which engage with the flanged ends $16^b$ of the radius link connector $15^b$—exert an inward axial pressure on the said flanges, and maintain them in close frictional engagement with the washers 37 and the cooperating sleeve heads $10^b$, $10^b$. The pivot bolt $9^b$ passes freely through the sleeve members $10^b$, $10^b$; and serves not only to clamp the inner convolutions of the coils $8^b$ against the flanged ends of the radius link $15^b$, but may also be used, when necessary, to supplement the spring pressure of the said coils on the surfaces of the discs, 37—37, and thereby increase the frictional restraint, and damping action, of these elements on the relative rotary movement of the heads $10^b$ and $16^b$.

The friction check mechanism for the outer end of the radius link $15^b$ comprises: the discs, $25^b$, $25^b$, and the plate $34^b$ (that are held against rotation with respect to the spacer cage by the ribs $30^b$); the discs, $26^b$, $26^b$, that are loosely keyed to the pivot bolt $14^b$ (by lugs projecting into the grooves $32^b$); the fibre or leather washers $28^b$, $28^b$, $28^b$, $28^b$ that are interposed between the adjacent faces of the two sets of discs and the end walls of the chamber in which they are enclosed; and the circumferential row of helical coil springs $27^b$, which are interposed between the discs $25^b$, $25^b$, and serve to maintain a uniform pressure engagement between the contacting surfaces of the friction check elements. In this construction two additional washers of fibrous material, 38, 38, are interposed between the inner faces of the link member $15^b$ and the adjacent surfaces of the spacer cage $13^b$ and the plate $34^b$, for the joint purpose of reinforcing the action of the enclosed discs ($25^b$—$26^b$—$28^b$, etc.) and of minimizing the wear on the spacer cage and radius link parts.

The pivot bolt $14^b$ is held in nonrotative engagement with the radius link $15^b$ by the pins $33^b$; and in this construction, it is also provided with a threaded stud nut 39, which is locked in any desired position of adjustment by the dog 40, and serves not only to prevent accidental displacement of the pivot bolt, but also to supplement the tension of the springs $27^b$ in holding the inner surfaces of the link arms in tight dust proof engagement with the washers 38, 38.

The construction last described also differs from that shown in Figs. 1 to 5 in the form and arrangement of the stop elements $21^b$ and $22^b$. These stops are made in the form of longitudinal ribs which extend across the spacer cage $13^b$ and engage with the edges of the spacer sleeve heads $10^b$, $10^b$ to limit the swinging movement of the radius link $15^b$. The shackle stop, $23^b$, for restraining excessive reverse rebound movements of the main spring $7^b$, is in substantially the same position, and acts in substantially the same way, as in the first described construction (Figs. 1 to 5).

Figs. 18, 19 and 20 illustrate the application of my improved friction damped supplemental spring suspension to a cross leaf main spring, which is secured at its center to the body of the vehicle, and is connected, at its ends, to the running gear thereof through the instrumentality of my invention. In this illustrative embodiment of my improvements the central pivot bolt $9^c$ of the system is rigidly clamped in the end of the L shaped axle bracket $19^c$ (as by means of the head and nut 41, 42) and is provided at its ends with slots or keyways $32^c$, $32^c$ which engage with lugs in the hubs of the sleeves $10^c$, $10^c$. The peripheral convolutions of the supplemental spiral spring elements $8^c$, $8^c$ are clamped between the end rings, $11^c$, $11^c$, and the interposed spacer, $13^c$, of the housing member; and the central convolutions of the said springs are supported on the sleeve members $10^c$, $10^c$. The radius link rocking guide element is, in this case, made up of two separate arms $15^c$, $15^c$, which are pivotally mounted on the ends of the cross bolt $14^c$ (which also serves as one of the bolts for clamping together the housing members, $11^c$—$13^c$—$11^c$), and which are provided at their inner ends with enlarged and recessed heads, $16^c$, $16^c$. Washers or discs $37^c$, $37^c$ of suitable fibrous material are mounted in the recessed faces of the heads $16^c$, and friction discs $26^c$, $26^c$ are held in nonrotative engagement with the ends of the pivot bolt $9^c$ by the adjustable nuts $17^c$, $17^c$. The spiral springs $8^c$, $8^c$ are conically and eccentrically wound—as shown in Fig. 20—and when clamped in position in the housing $11^c$—$13^c$, they serve to not only elastically couple the said housing to the pivot bolt support $19^c$, but also to maintain a pressure engagement between the surfaces of the friction disc elements ($10^c$—$16^c$—$26^c$—$37^c$); and this spring pressure may be supplemented to any desired extent by the adjustment of the nuts $17^c$, $17^c$.

The elimination of the rocking movement of the guide links $15^c$, $15^c$—and the corresponding limitation of the flexural strain in the spiral spring coils—is effected, in this last described construction, by the engagement of the enlarged heads, $16^c$, of the links, with the inner peripheries of the housing rings, $11^c$, $11^c$, at the points $21^c$, $22^c$. The limitation of the shackled movement of the end of the main spring $7^c$—on rebound or recoil—is effected by the contact of the edge $23^c$, of the housing cage $13^c$, with the upper face of the axle bracket $19^c$.

In order to more effectively protect the outer bearings of the link arms, $15^c$, $15^c$—and also obtain a secondary frictional restraint at these points—discs $38^c$, $38^c$, of suitable fibrous material, may be interposed between the ends of these arms and the adjacent faces of the housing rings $11^c$, $11^c$ and the clamping washers and nuts $39^c$ on the bolt $14^c$. The design and arrangement of parts is such that both ends of the housing member—and the swinging guide links and friction check elements associated therewith—may also be completely covered and enclosed by sheet metal caps (one of which is shown in dotted lines in the upper part of Fig. 19) which are removably clipped, to the housing rings $11^c$, $11^c$, by the heads and nuts of the bolts $12^c$, $12^c$ and $14^c$.

Figs. 21 and 22 illustrate a modified embodiment of my invention in which an ordinary helical coil spring is utilized as the supplemental resilient suspension element. In this form of construction the housing member $11^d$, which supports one end of the auxiliary compression spring $8^d$, is riveted, or otherwise rigidly secured, to the body member $6^d$ of the chassis frame; and the guide link $15^d$, which carries the opposite end of said spring, is supported on the pivot bolt $14^d$ that passes through the hollow boss $13^d$, on the said housing. A series of interdigitated friction discs and washers, similar in form and arrangement to the assemblage shown in Fig. 17, are mounted in the chamber of the hollow boss, $13^d$, between the forked ends of the guide link $15^d$, and are maintained in pressure engagement with each other, and with the end bearing faces of the said link, by a circumferential row of springs $27^d$—corresponding to the springs 27ᵇ of the previously described construction—and the adjustable nut, 39ᵈ, on the bolt 14ᵈ. The angular movement of the guide connector 15ᵈ—and the corresponding compression and expansion of the supplemental spring 8ᵈ—is limited, as before, by stop lugs, 21ᵈ and 22ᵈ, on the body of the housing 11ᵈ, 13ᵈ. The inward swing of the shackle connectors 20ᵈ, 20ᵈ—which, in this case, are interposed between the end of the main spring 7ᵈ and the link 15ᵈ—is limited by the lugs, 23ᵈ, which cooperate with the lugs 22ᵈ, to arrest the reverse flexure and "shortening" of the main spring, after a predetermined amount of rebound movement has taken place, and thus bring into play the longitudinal and transverse elasticity of the said primary suspension element in resisting further recoil or separation of the spring connected parts. The various elements of the organization last described coact with each other, in eliminating side sway and "pitching"—or other detrimental transverse displacements—of the vertically oscillating parts; in preventing undue flexure of the supplemental spring elements; in checking or damping rapid oscillations or objectionable rebound movements of these auxiliary suspension members, (without imposing any frictional restraint on the main spring element); in checking abnormal recoil action of the primary suspension spring (and causing it to perform a "double acting" function in resisting excessive oscillations in both directions); and in automatically taking up wear at the principal point of pivot suspension; and in all these respects the construction illustrated in Figs. 21 and 22 presents the main generic features of my present invention. It also presents certain detail features of structure and operation which differ, in some respects from those that characterize the devices shown in Figs. 1 to 20 inclusive. These features are more specifically described and claimed in my copending application Ser. No. 303,314.

The organization illustrated in Figs. 23 and 24 is another modified embodiment of my generic improvements, as applied to a combination of a main cross leaf spring and a supplemental cantilever leaf spring, of the general type described in my prior Patent No. 1,293,425. In this construction the auxiliary cantilever spring 8ᵉ is rigidly secured, at one end, to the rocking lever member 15ᵉ, and is flexibly connected at its opposite end to what may be termed a cage or housing member, 11ᵉ, that is loosely slipped to an intermediate portion of the main spring 7ᵉ; and the latter is coupled at its extremity to the lever 15ᵉ, by means of the shackle links 20ᵉ, and the pivot bolts 9ᵉ and 18ᵉ. The enlarged hub of the lever 15ᵉ is supported on the main pivot bolt 14ᵉ—between the forked ends 13ᵉ, 13ᵉ of the axle perch member 19ᵉ— and is chambered to receive a friction check mechanism similar to the one shown in Figs. 16 and 17 (and also in Fig. 22). The oscillatory movement of the lever on its pivot bolt is limited by the two stops 21ᵉ and 22ᵉ; and excessive rebound flexure of the main spring is prevented by the cooperation of the stop 22ᵉ with the stop bolt 23ᵉ which engages with the lower side of the main spring (when the latter recoils beyond normal load position).

In the normal operation of the construction last described the various structural elements coact to perform the same functions, and attain the same general results, as are generically characteristic of the previously considered embodiments of my invention; but this construction—like the one illustrated in Figs. 21 and 22—also presents certain detail features of organization that are not found in the first four forms of spiral spring suspension systems hereinbefore described; and these specific characteristics have therefore been set forth more at length in a second copending application Ser. No. 303,315.

The numerous advantages and useful results that can be secured by the utilization of my improvements in various types of supplemental spring shock absorber construction—that are either similar to, or quite different from those herein shown—will now be appreciated by those skilled in this art; and, in the light of the different illustrative embodiments of my invention that have been already described or suggested, engineers will be enabled to design many other forms of such construction that will effectively utilize, in whole or in part as may be desired, the various characteristic features of organization that form the subject matter of my present disclosure, and apply them to the various associations of spring suspension systems that are employed to support the body members from the axle or running gear parts of vehicles. I do not, therefore, desire to limit myself to the use of my improvement in any specific type or species of supplemental spring suspension system; but having fully described my invention, and having indicated the wide scope of its application, what I claim as new is—

1. A combination of an auxiliary suspension spring interposed between an end of the main spring and one of the vehicle members, with frictionally engaged rotary disks for damping the oscillatory movements of the said auxiliary spring.

2. In a vehicle suspension system, the combination of a primary spring, a more elastic secondary spring interposed between the end of the primary spring and one of the relatively movable vehicle elements, and means comprising frictionally engaged rotary disk elements for supplementing the resilient resistance of the secondary spring by frictional retardation of its oscillatory movements.

3. A vehicle shock absorber which comprises a main spring, an auxiliary spring cooperating therewith, and means comprising frictionally engaged disk members for supplementing the normal elastic resistance and increasing the normal period of elastic oscillation of the said auxiliary spring, without imposing any restraint on the free vibrations of the said main spring, said auxiliary spring connected between one end of the main spring and one of the relatively movable vehicle elements.

4. A vehicle suspension system comprising a frame element, an axle element, a main spring, a supplemental spring interposed between the end of the said main spring and one of the relatively movable vehicle elements and frictional means for limiting the elastic deformation and flexure of the supplemental and main springs.

5. In a shock absorber adapted to be interposed between the main spring of a vehicle or its support and the opposing chassis member, the combination of a supplemental spring coacting in series with the main spring, a rocking guide connected at one of its extremities to a supplementary spring and at its other extremity to a vehicle member with a friction check for retarding the movement of the said rocking guide and its connecting spring.

6. The combination of a main spring, a secondary spring interposed between the main spring and one of the relatively movable vehicle members, guide means for preventing side sway or lateral displacement of the vertically oscillating spring connected parts; and means for automatically compensating for wear between the moving parts of the said guide means.

7. A shock absorber comprising a supplemental spring, means for constraining the extremities of the said spring to movement in a vertical plane, and means for automatically taking up the wear between the relatively moving parts of the said constraint means.

8. A vehicle suspension comprising a main spring, a supplemental spring coupled thereto, guide means for preventing side sway or lateral displacement of the relatively movable spring connected parts, and compensating means for automatically maintaining close engagement between the bearing surfaces of the said guide means.

9. The combination of a main spring, a secondary spring connected at one extremity to the said main spring and at the other extremity to one of the chassis members of a vehicle, a rocking guide member for maintaining vertical alignment between the two relatively movable extremities of the secondary spring, and means for automatically taking up any wear at the bearing surfaces of the rocking guide.

10. In a shock absorber for vehicles, a vehicle frame, a leaf spring, a supplementary spring interposed between the end portion of the leaf spring and the vehicle frame, pivoted lever mechanism connecting the main spring and frame, friction-plates, said friction-plates damping the action of the supplementary spring and also maintaining alignment of the pivoted lever mechanism.

11. In a shock absorber for vehicles, a vehicle frame, a main spring, a supplementary spring interposed between the vehicle frame and end of the main spring, pivoted levers connecting said main spring to said frame, friction plates, said friction plates damping the action of the supplementary spring and maintaining alignment of the main spring and frame.

12. In combination with a vehicle frame and a vehicle leaf spring, a supplementary spring pivoted to said frame, an oscillating housing for supporting said supplementary spring and connecting eccentrically with the adjacent end of the leaf spring, means for connecting the frame and housing, and a friction device damping the action of the supplementary spring.

13. In combination with a vehicle frame and a vehicle leaf spring, a spiral spring pivoted at its axis to said frame, an oscillating housing for confining the spiral spring and forming an eccentric connection with the adjacent end of the leaf spring, means for connecting the frame and housing, and a friction device damping the action of the spiral spring.

14. In combination with a vehicle frame and a vehicle leaf spring, a spiral spring pivoted at its axis to said frame, an oscillating housing for confining the outer peripheral edge of said spiral spring within prescribed limits and providing an eccentric connection for the adjacent end of the vehicle leaf spring, means pivotally connecting said housing with the frame, and means damping the action of the spiral spring.

15. In combination with a vehicle frame and a vehicle leaf spring, a spiral spring pivoted at its axis to said frame, oscillating housing for confining said spiral spring, means pivotally connecting said housing eccentrically with said frame, means pivotally connecting the adjacent end of the leaf spring to said housing and a friction device damping the oscillatory movement of the housing and vibratory action of said spiral spring.

16. In combination with a vehicle frame and a vehicle leaf spring, a spiral spring pivoted at its axis to said frame, an oscillating housing for confining said spiral spring and forming an eccentric connection for the adjacent end of the leaf spring, means pivotally connecting said housing eccentrically with said frame, a friction device damping the oscillatory movement of the housing and vibratory action of the spiral spring, and means for limiting the range of oscillation of said housing.

17. In combination with a vehicle frame and a vehicle leaf spring, a spiral spring pivoted at its axis to said frame, an oscillating housing confining the spiral spring and forming an eccentric connection with the frame, means for connecting the adjacent end of the leaf spring to said housing at a point eccentric to the point for attaching the frame, and a friction device damping the action of the spiral spring.

18. A shock absorber comprising a conically wound supplemental spring, means for connecting the extremities thereof to the body and axle members of a vehicle and a friction check mechanism the parts of which are maintained in operative engagement by the said conical supplemental spring.

19. In a shock absorber the combination of a spring support or housing adapted for attachment to one of the members of a chassis frame, a guide member attached to the said housing, a friction check mechanism associated with the said guide member, and a conically wound spiral spring supported at one extremity in the said housing and connected at its other extremity to the said guide member and serving both to elastically connect the housing and the guide, and to also maintain the elements of the friction check mechanism in operative engagement with each other.

20. The combination of a supplemental spring, a guide for maintaining the extremities thereof in proper alignment with each other, stops for arresting the movement of the said guide member and thereby limiting the strain imposed on the supplemental spring, and means for automatically compensating for wear between the bearing surfaces of the said guide members.

21. The combination of a supplemental spring, means for attaching the extremities thereof to the body and axle members of a vehicle, a guide for maintaining the said extremities in proper alignment with each other, stops for arresting the movement of the said guide and thereby limiting the distortion of the said spring, and means for maintaining close engagement of the bearing surfaces of the said guide and excluding dust and dirt therefrom.

22. The combination of a supplemental spring, means for connecting the extremities thereof to the body and axle members of a vehicle, a guide for maintaining the alignment of said connections, stops for limiting the movement of the said guide, and a friction check mechanism for damping the oscillatory movement of the supplemental spring, and also maintaining close engagement between the bearing surfaces of the said guide.

23. The combination of a main spring, a supplemental spring coacting therewith, a guide for maintaining proper alignment between the coacting elements, a plurality of stops for successively limiting the deflection of the two springs, and friction check mechanism for damping the oscillations of the supplemental spring without restricting the movements of the main spring.

24. In a shock absorbing device the combination of a main spring, a supplemental spring, means for attaching one extremity of the supplemental spring to the main spring, and the other extremity thereof to the opposed member of the vehicle, a guide for maintaining the said extremities in alignment with each other, stops for limiting the movement of said guide member in a vertical plane, and a friction check mechanism for damping the oscillatory movements of the supplemental spring and maintaining close engagement between the bearing surfaces of the said guide member.

25. In a shock absorber the combination of a cage or housing, means for attaching said housing to a vehicle member, a rocking guide member pivotally supported on the said housing, stops for limiting the angular movement of said rocking guide, a conically wound supplemental spring connected at its extremities to the housing and to the guide member, and a friction check mechanism the parts of which are maintained in operative engagement by the said conically wound spring.

26. The combination of a supplemental spring adapted to be interposed between the main spring of a vehicle or its support and the opposing chassis member, means for limiting the diametrical compression of said supplemental spring, means for maintaining the vehicle alignment of the extremities of said supplemental spring, means for frictionally damping the oscillatory movement of said supplemental spring, and means for taking up the wear in the connecting parts of said frictional damping means.

In witness whereof, I have hereunto set my hand and seal at Indianapolis, Indiana, this 4th day of November, A. D., one thousand nine hundred and nineteen.

ROBERT H. HASSLER. [L. S.]